(12) United States Patent
Kasuya et al.

(10) Patent No.: US 10,603,973 B2
(45) Date of Patent: Mar. 31, 2020

(54) SUSPENSION SYSTEM

(71) Applicant: HITACHI AUTOMOTIVE SYSTEMS, LTD., Ibaraki (JP)

(72) Inventors: Kentaro Kasuya, Atsugi (JP); Nobuyuki Ichimaru, Atsugi (JP); Takahide Kobayashi, Atsugi (JP); Ryusuke Hirao, Atsugi (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 316 days.

(21) Appl. No.: 15/740,583

(22) PCT Filed: Jun. 15, 2016

(86) PCT No.: PCT/JP2016/067762
§ 371 (c)(1),
(2) Date: Dec. 28, 2017

(87) PCT Pub. No.: WO2017/002617
PCT Pub. Date: Jan. 5, 2017

(65) Prior Publication Data
US 2018/0194188 A1    Jul. 12, 2018

(30) Foreign Application Priority Data
Jun. 30, 2015    (JP) .................................. 2015-131334

(51) Int. Cl.
*B60G 17/0185* (2006.01)
*B60G 17/052* (2006.01)
(Continued)

(52) U.S. Cl.
CPC ..... *B60G 17/0185* (2013.01); *B60G 17/0525* (2013.01); *B60R 16/023* (2013.01);
(Continued)

(58) Field of Classification Search
CPC .......... B60G 17/0185; B60G 2800/802; B60G 2800/80; B60G 2400/252;
(Continued)

(56) References Cited

U.S. PATENT DOCUMENTS

| 4,651,838 A | * | 3/1987 | Hamilton | ........... B60G 17/0155 |
| | | | | 177/141 |
| 4,763,222 A | * | 8/1988 | Heaston | ............. B60G 17/0185 |
| | | | | 280/6.158 |

(Continued)

FOREIGN PATENT DOCUMENTS

| JP | 01-103517 | 4/1989 |
| JP | 02-296569 | 12/1990 |

(Continued)

OTHER PUBLICATIONS

International Search Report dated Sep. 6, 2016 in International Application No. PCT/JP2016/067762.

*Primary Examiner* — Peter D Nolan
(74) *Attorney, Agent, or Firm* — Wenderoth, Lind & Ponack, L.L.P.

(57) ABSTRACT

The invention detects at least either one of a supply fault and a ground fault distinctively from a disconnection. A compressor relay 22 is placed between a battery 21 and an air compressor module 5. The compressor relay 22 controls the drive and stop of the air compressor module 5. A compressor driver 26 outputs a drive signal to the compressor relay 22. A ground-side voltage monitor 28 detects the drive voltage of the compressor relay 22. A pressure sensor 17 detects air pressure in a discharge side of the air compressor module 5. A microcomputer 30 of a controller 25 detects a ground fault and a disconnection of the drive signal of the compressor 22 distinctively from each other on the basis of a voltage value (Continued)

Vg detected by the ground-side voltage monitor 28 and a pressure valve P detected by the pressure sensor 17.

5 Claims, 14 Drawing Sheets

(51) Int. Cl.
  *B60R 16/023* (2006.01)
  *G06F 11/07* (2006.01)
  *B60W 50/02* (2012.01)
(52) U.S. Cl.
  CPC .... *G06F 11/0739* (2013.01); *B60G 2400/252* (2013.01); *B60G 2400/51222* (2013.01); *B60G 2500/30* (2013.01); *B60G 2800/80* (2013.01); *B60G 2800/802* (2013.01); *B60W 50/0205* (2013.01)
(58) Field of Classification Search
  CPC ...... B60G 2400/51222; B60G 2500/30; G06F 11/0739; B60R 16/023; B60W 50/0205
  See application file for complete search history.

(56) References Cited

U.S. PATENT DOCUMENTS

| | | | | |
|---|---|---|---|---|
| 4,783,089 A * | 11/1988 | Hamilton | ........... | B60G 17/0155 280/5.514 |
| 5,120,982 A * | 6/1992 | Yopp | ................. | B60G 17/0185 307/10.1 |
| 5,170,343 A | 12/1992 | Matsuda | | |
| 5,322,321 A * | 6/1994 | Yopp | ...................... | B60G 15/08 280/5.514 |
| 5,393,087 A * | 2/1995 | Taniguchi | .......... | B60G 17/0155 280/6.158 |
| 6,260,859 B1 * | 7/2001 | Dixon | .................. | B60G 17/005 280/5.514 |
| 6,983,201 B2 * | 1/2006 | Misawa | ............. | B60G 17/0525 280/5.5 |
| 7,416,189 B2 * | 8/2008 | Wilde | .................... | B60G 15/12 280/124.16 |
| 8,219,262 B2 * | 7/2012 | Stiller | ................ | B60G 17/0155 280/47.33 |
| 8,600,643 B2 * | 12/2013 | MacFarlane | ........... | B60G 17/04 180/176 |
| 2001/0005803 A1 * | 6/2001 | Cochofel | ............. | B60G 17/0185 701/1 |
| 2008/0021611 A1 * | 1/2008 | Hiebert | .............. | B60G 17/0185 701/37 |
| 2017/0182858 A1 * | 6/2017 | Coakley | .................. | B60C 17/04 |

FOREIGN PATENT DOCUMENTS

| | | |
|---|---|---|
| JP | 3-129509 | 12/1991 |
| JP | 2012-116440 | 6/2012 |
| JP | 2013-199874 | 10/2013 |

* cited by examiner

Fig. 6

| | NORMAL<br>FS RELAY ON<br>COMPRESSOR DRIVER ON | NORMAL<br>FS RELAY ON<br>COMPRESSOR DRIVER OFF | GROUND FAULT<br>FS RELAY ON<br>COMPRESSOR DRIVER OFF | DISCONNECTION<br>FS RELAY ON<br>COMPRESSOR DRIVER OFF |
|---|---|---|---|---|
| BATTERY-SIDE VOLTAGE MONITOR VOLTAGE VALUE Vb | High | High | High | High |
| GROUND-SIDE VOLTAGE MONITOR VOLTAGE VALUE Vg | Low | High | Low | Low |
| RELAY CURRENT | I0 | 0 | If1 | 0 |
| COMPRESSOR RELAY | ON | OFF | ON | OFF |

Fig. 11

|  | NORMAL<br>FS RELAY ON<br>COMPRESSOR DRIVER ON | NORMAL<br>FS RELAY OFF<br>COMPRESSOR DRIVER ON | GROUND FAULT<br>FS RELAY OFF<br>COMPRESSOR DRIVER ON | DISCONNECTION<br>FS RELAY OFF<br>COMPRESSOR DRIVER ON |
|---|---|---|---|---|
| GROUND-SIDE VOLTAGE MONITOR VOLTAGE VALUE Vg | Low | High | Low | Low |
| BATTERY-SIDE VOLTAGE MONITOR VOLTAGE VALUE Vb | High | High | High | High |
| RELAY CURRENT | I0 | 0 | If1 | 0 |
| COMPRESSOR RELAY | ON | OFF | ON | OFF |

Fig. 14

|  | NORMAL<br>FS RELAY ON<br>COMPRESSOR DRIVER OFF | DISCONNECTION<br>FS RELAY ON<br>COMPRESSOR DRIVER OFF | GROUND FAULT<br>FS RELAY ON<br>COMPRESSOR DRIVER OFF | SUPPLY FAULT<br>FS RELAY ON<br>COMPRESSOR DRIVER OFF |
|---|---|---|---|---|
| GROUND-SIDE MONITOR VOLTAGE VALUE Vg | Low | Low | Low | Low |
| BATTERY-SIDE MONITOR VOLTAGE VALUE Vb | Low | Low | Low | High |
| RELAY CURRENT | 0 | 0 | 0 | If2 |
| COMPRESSOR RELAY | OFF | OFF | OFF | ON |

SUSPENSION SYSTEM

TECHNICAL FIELD

The invention relates to suspension systems suitable for being installed in vehicles, such as four-wheeled vehicles.

BACKGROUND ART

Air suspension systems are one of the known suspension systems. An air suspension system includes an air compressor, an air suspension body, and a plurality of valves. In the air suspension system, the valves determine flow passages. The air compressor pressurizes and supplies air to the air suspension body to raise vehicle height, and the air is discharged from the air suspension body to lower the vehicle height.

Electric instruments installed in a vehicle are equipped with various types of failure detectors (see Patent Literature 1, for example). The Patent Literature 1 discloses a system including current source circuits for detecting failures, and current detection devices for detecting the current of the circuits. The system makes a comparison with proper two reference currents and distinguishes between a normal operation, a disconnection failure, and a ground fault failure.

CITATION LIST

Patent Literature

PTL 1: Japanese Unexamined Patent Application Publication (Kokai) No. 2013-199874

SUMMARY Of INVENTION

Technical Problem

When an air suspension system has, for example, a disconnection in a drive circuit of an electric motor which is used in an air compressor, the air compressor is stopped. This discontinues she compressed air supply to an air suspension body, so that vehicle height is not raised. If the system has a ground fault in the drive circuit of the electric motor, the air compressor is driven. The compressed air is therefore supplied to the air suspension body, which raises the vehicle height. In this way, the air compressor and the air suspension body each behave differently between when a disconnection occurs and when a ground fault occurs. This makes it possible to implement control appropriate to each case. The same can be said for a disconnection and a supply fault. However, conventional suspension systems do not distinguish a disconnection, a ground fault, and a supply fault from one another, and the whole systems stop in any of these cases.

The failure detector discussed in the Patent Literature 1 needs to be provided with a separate current source circuit or the like in order to detect a disconnection failure and a ground fault failure distinctively from each other. This causes the problem that production cost is increased.

An object of the invention is to provide a suspension system capable of detecting at least either one of a supply fault and a ground fault distinctively from a disconnection.

Solution to Problem

A suspension system according to one embodiment of the invention includes a battery installed in a vehicle; a fluid power pump operated by being powered by the battery; a relay connecting the battery and the fluid power pump; fluid power suspension bodies mounted on a plurality of wheels of the vehicle; supply/exhaust valves placed between the fluid power pump and the respective fluid power suspension bodies; an exhaust valve configured to discharge a working fluid in a discharge side of the fluid power pump; a pressure detection device configured to detect pressure of the working fluid in the discharge side of the fluid power pump; a relay driving device configured to output a drive signal to the relay; a voltage detection device configured to detect drive voltage of she relay; a vehicle behavior detection device configured to detect behavior of the vehicle; and a control device. The control device includes a failure determination device configured to detect at least either one of a supply fault and a ground fault of the drive signal of the relay distinctively from a disconnection on the basis of a voltage value detected by the voltage detection device and a pressure value detected by the pressure detection device.

The one embodiment of the invention makes it possible to detect at least either one of a supply fault and a ground fault distinctively from a disconnection.

BRIEF DESCRIPTION OF DRAWINGS

FIG. 6 is an explanatory chart showing voltage values of a voltage monitor, relay currents, and ONs and OFFs of a compressor relay, under a normal condition, a ground fault condition, and a disconnection condition, according to the first embodiment of the invention;

FIG. 11 is an explanatory chart showing voltage values of voltage monitors, relay currents, and ONs and OFFs of a compressor relay, in normal conditions, a ground fault condition, find a disconnection condition, according to the third embodiment of the invention;

FIG. 14 is an explanatory chart showing voltage values of voltage monitors, relay currents, and ONs and OFFs of a compressor relay, in a normal condition, a disconnection condition, a ground fault condition, and a supply fault condition, according to the fourth embodiment of the invention.

DESCRIPTION OF EMBODIMENTS

An air suspension system as a suspension system according to embodiments of the invention will be explained in details with reference to the attached drawings, taking as an example a situation where the system is installed in a vehicle, such as a four-wheeled vehicle.

Figure 1:
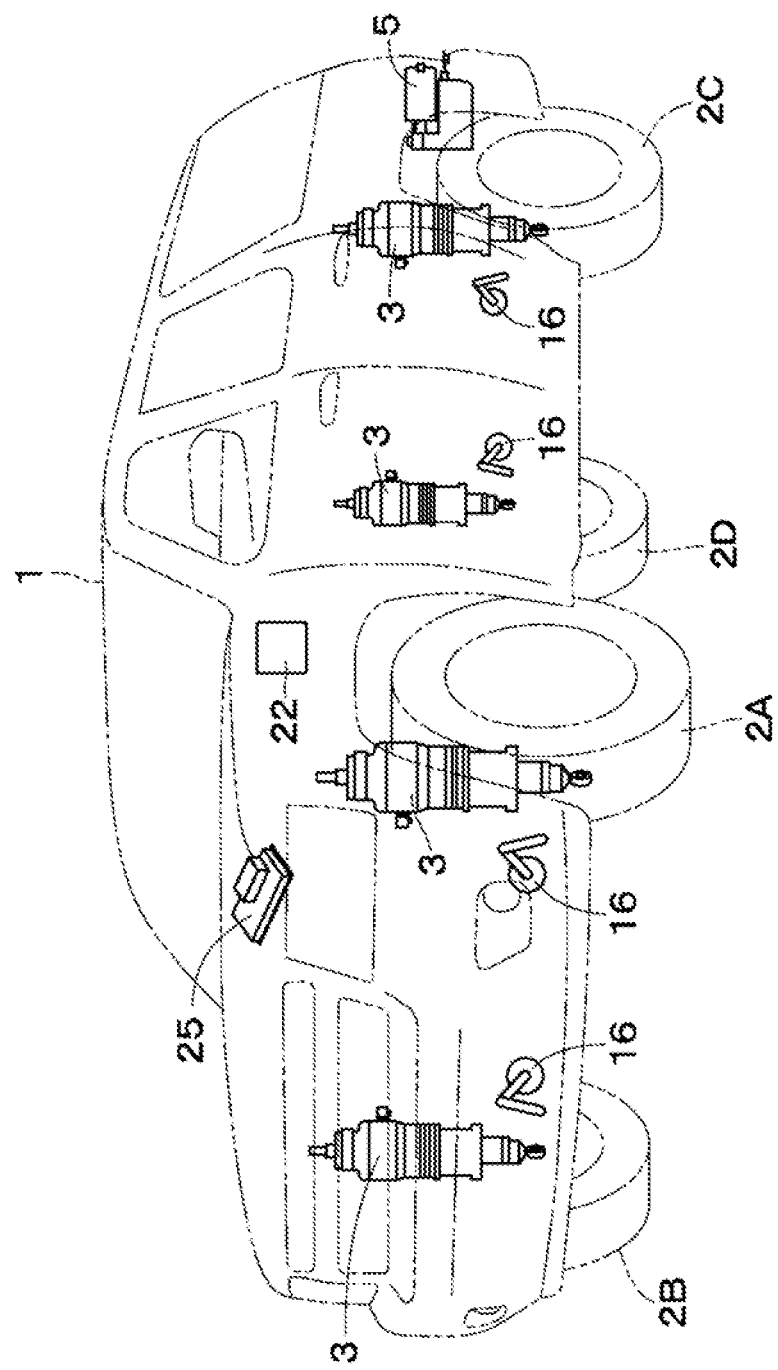
FIG. 1 is a conceptual diagram showing a vehicle equipped with an air suspension system according to a first embodiment of the invention.

FIGS. 1 to 6 show a first embodiment of the invention. In FIG. 1, left-front and right-front wheels 2A and 2B (front wheels) and left-rear and right-rear wheels 2C and 2D (rear wheels) are disposed under (on a road side of) a vehicle body 1 comprising a body of the vehicle.

Figure 2:
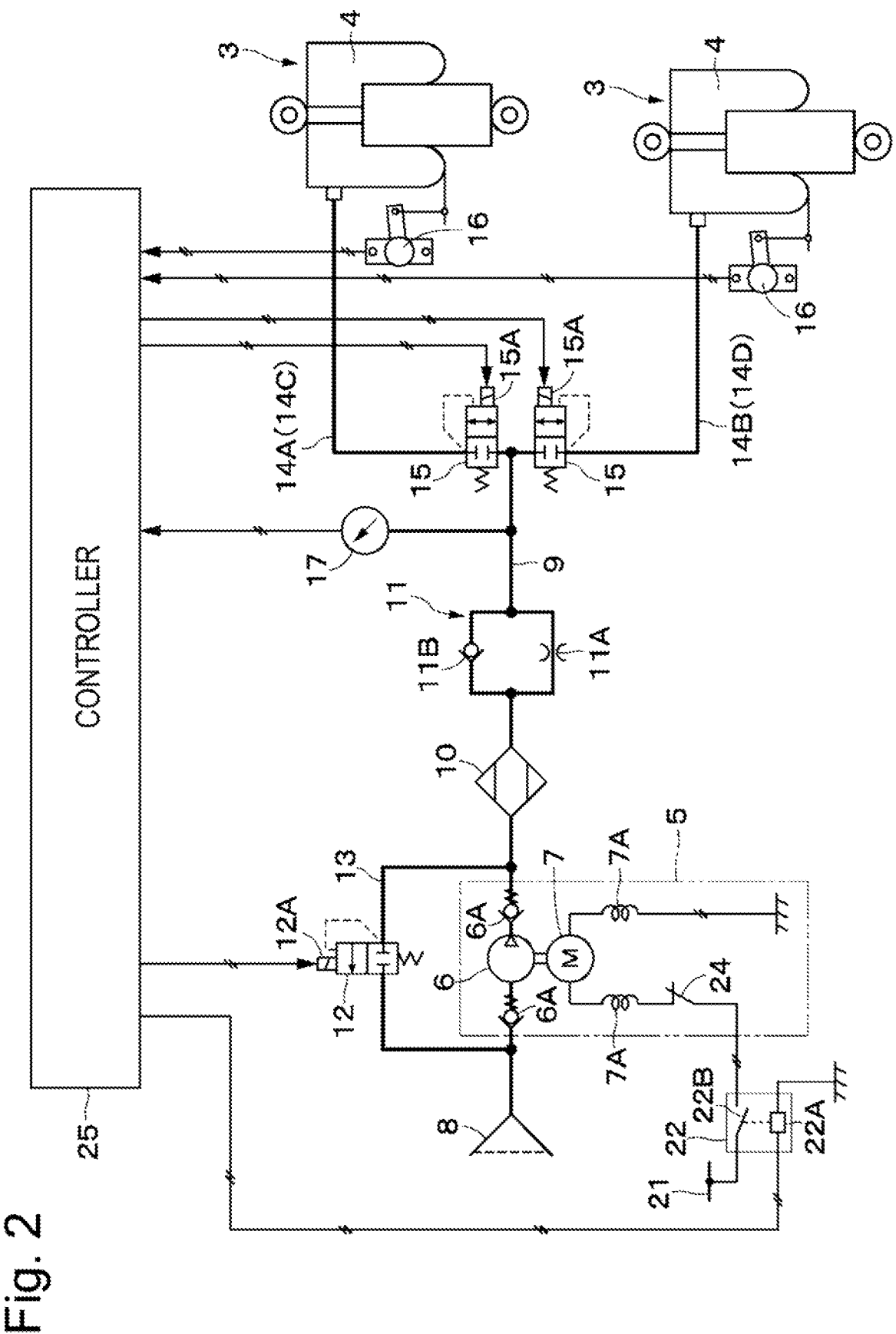
FIG. 2 is a view showing a circuit configuration of the air suspension system according to the first embodiment of the invention.

Air suspensions 3 configure fluid (oil and/or air) power suspension bodies. The air suspensions 3 are provided to the four wheels 2A to 2D of the vehicle. More specifically, the air suspensions 3 are interposed between the vehicle body 1 and the wheels 2A to 2D in the vehicle. The air suspensions 3 include four air suspensions 3 so as to correspond to the four wheels 2A to 2D (FIG. 2 shows only two of the four wheels). The air suspensions 3 each include an air spring 4, The air suspensions 3 tire configured to supply or discharge air as a working fluid to adjust vehicle height of the vehicle 1.

When compressed air is supplied or discharged through diverging conduits 14A to 14D and supply/exhaust valves 15, described later, the air springs 4 vertically expand or contract in accordance with a supply or discharge amount (air amount). This causes the air suspensions 3 to individually perform the vehicle height adjustment of the vehicle 1, so that the vehicle height is raised or lowered with respect to each of the wheels 2A to 2D.

An air compressor module 5 includes an air compressor 6 and an electric motor 7, and configures a fluid power pump operated by being powered by a battery 21. The air compressor module 5 is installed, for example, in a rear part of the vehicle 1, and supplies compressed air to the air springs 4 of the air suspensions 3.

The air compressor 6 comprises, for example, a reciprocating compressor, a scroll compressor or the like. Check valves 6A are respectively placed on an intake side and a discharge side of the air compressor 6. The air compressor 6 is driven by the electric motor 7 functioning as a drive source. The air compressor 6 compresses external or atmospheric air which is sucked from an intake filter 8 side, to thereby generate compressed air (air). The intake filter 8 also serves as a silencer for reducing noises generated during the air suction.

A supply/exhaust conduit 9 is connected to the discharge side of the air compressor 6. As shown in FIG. 2, the supply/exhaust conduit 9 is connected to the discharge side of the air compressor 6 in one side (proximal end side) and extends to outside the air compressor module 5 in the other side (distal end side). Connected to the distal end side of the supply/exhaust conduit 9 are the after-mentioned diverging conduits 14A to 14D.

An air dryer 10 is interposed in the supply/exhaust conduit 9. The air dryer 10 is configured to dry air. The air dryer 10 contains, for example, a moisture absorbing agent, not shown, or the like. The air dryer 10 is disposed between a slow return valve 11 and an exhaust conduit 13 described later. The slow return valve 11 includes a parallel circuit formed of a throttle 11A and a check valve 11B. The check valve 11B opens to a forward flow which travels from the air compressor 6 toward the air suspensions 3, and does not reduce a flow rate of the compressed air. However, the check valve 11B is closed to a backward flow, and the flow rate of the compressed air is reduced by the throttle 11A. The compressed air then slowly flows backward at a low flow rate.

When the compressed air created in the air compressor 6 forwardly flows in the direction of the air suspensions 3, the air dryer 10 brings the compressed air into contact with the moisture absorbing agent located inside to absorb moisture. The air dryer 10 then supplies the dried compressed air toward the air springs 4. When the compressed air discharged from she air springs 4 (exhaust air) flows backward within the air dryer 10, the air which flows backward within the air dryer 10 is dried air. During this time, the dried air desorbs the moisture of the moisture absorbing agent in the air dryer 10. The moisture absorbing agent is thus regenerated and recovers a moisture absorbable condition.

An exhaust valve 12 (air release valve) discharges air (working fluid) existing in a discharge side of the air compressor module 5 (air compressor 6). The exhaust valve 12 is connected to the supply/exhaust conduit 9 through the exhaust conduit 13. The exhaust valve 12 includes a solenoid (coil) 12A. The exhaust valve 12 comprises, for example, a 2-port 2-position electromagnetic switching valve (spring-offset normally closed valve). The exhaust valve 12 is normally closed to block the exhaust conduit 13. When the solenoid 124 of the exhaust valve 12 is energized by a controller 25 to be excited, the exhaust valve 12 is opened to bring the exhaust conduit 13 into communication. The exhaust valve 12 thus discharges (releases) the compressed air existing in the supply/exhaust conduit 9 into the atmosphere.

The diverging conduits 14A to 14D are formed by dividing the supply/exhaust conduit 9 into four correspondingly to the wheels 2A to 2D and extend toward the air suspensions 3 of the wheels 2A to 2D. The four diverging conduits 14A to 14D connect, the air compressor module 5 to the air springs 4 of the air suspensions 3. The diverging conduits 14A to 14D diverge at a tip of the supply/exhaust conduit 9 to connect the air springs 4 to the supply/exhaust conduit 9.

The supply/exhaust valves 15 (supply-and-exhaust valves) are placed between the air compressor module 5 and the respective air suspensions 3. To be specific, the supply/exhaust valves 15 are placed in the four diverging conduits 14A to 14D so as to be located between the air compressor 6 of the air compressor module 5 and the air springs 4 of the air suspensions 3. Each of the supply exhaust valves 15 is configured in the same manner as the exhaust valve 12. The supply exhaust valve 15 therefore includes a solenoid 15A and comprises, for example, a 2-port 2-position electromagnetic switching valve, in this case, the supply exhaust valve 15 is configured as a spring-offset normally closed valve. The present embodiment employs the supply exhaust valves 15 each in which an air supply valve and an air exhaust valve are integral with each other. However, the air supply valve and the air exhaust valve may be separately provided.

The solenoids 15A are electrically connected to the controller 25. When the solenoids 15A are powered by the controller 25, the supply/exhaust valves 15 suction (displace) plungers, not shown, against spring force to be opened. In this open valve state, the compressed air can be supplied to or discharged from the corresponding air suspensions 3. When the power supply to the solenoids 15A is discontinued, the supply/exhaust valves 15 are closed due to the spring force. This closed valve state allows the supply/ exhaust valves 15 to discontinue the compressed air supply or discharge to or from the air suspensions 3.

Each of the air suspensions 3 is provided with a vehicle height sensor 16. The vehicle height sensor 16 configures a vehicle behavior detection device for detecting behavior of a vehicle. Each of the vehicle height sensors 16 detects the vehicle height of the corresponding air suspension 3 on the basis of a length dimension (vertical dimension) of the air spring 4 in a direction where the air spring 4 expands or contracts, the vehicle height sensor 16 then outputs a detection signal of the vehicle height to a microcomputer 30 of the controller 25. The detection signal comprising an analogue signal, which is outputted from the vehicle height sensor 16, is converted into a digital signal by an A/D converter 31 installed in the microcomputer 30. The detection signal is then inputted to the microcomputer 30.

The supply/exhaust conduit 9 is provided with a pressure sensor 17. The pressure sensor 17 is placed between the slow return valve 11 and the supply/exhaust valves 15. The pressure sensor 17 configures a pressure detection device and detects a pressure value P of the compressed air (air) existing in the discharge side of the air compressor module 5 (air compressor 6). More precisely, the pressure sensor 17 detects the pressure value P of the compressed air supplied to the air springs 4. The pressure sensor 17 then outputs a detection signal of the pressure value P to the microcomputer 30 of the controller 25. The detection signal comprising the analogue signal, which is outputted from the pressure sensor 17, is converted into a digital signal by the A/D converter 31 installed in the microcomputer 30. The detection signal is then inputted to the microcomputer 30.

An electric circuit for driving the air compressor 6 and the electric motor 7 will be now discussed with reference to FIG. 3.

The battery 21 is installed in the vehicle. The battery 21, which works as a power source, is connected with a positive terminal of the electric motor 7 via a compressor relay 22 and a fuse 23. A negative terminal of the electric motor 7 is connected to the ground. The positive and negative terminals of the electric motor 7 are connected with a choke coil 7A for preventing or reducing inrush current or the like. The positive terminal of the electric motor 7 is further connected to a thermal relay 24 at a position between the choke coil 7A and the battery 21 (see FIG. 2).

Figure 3:
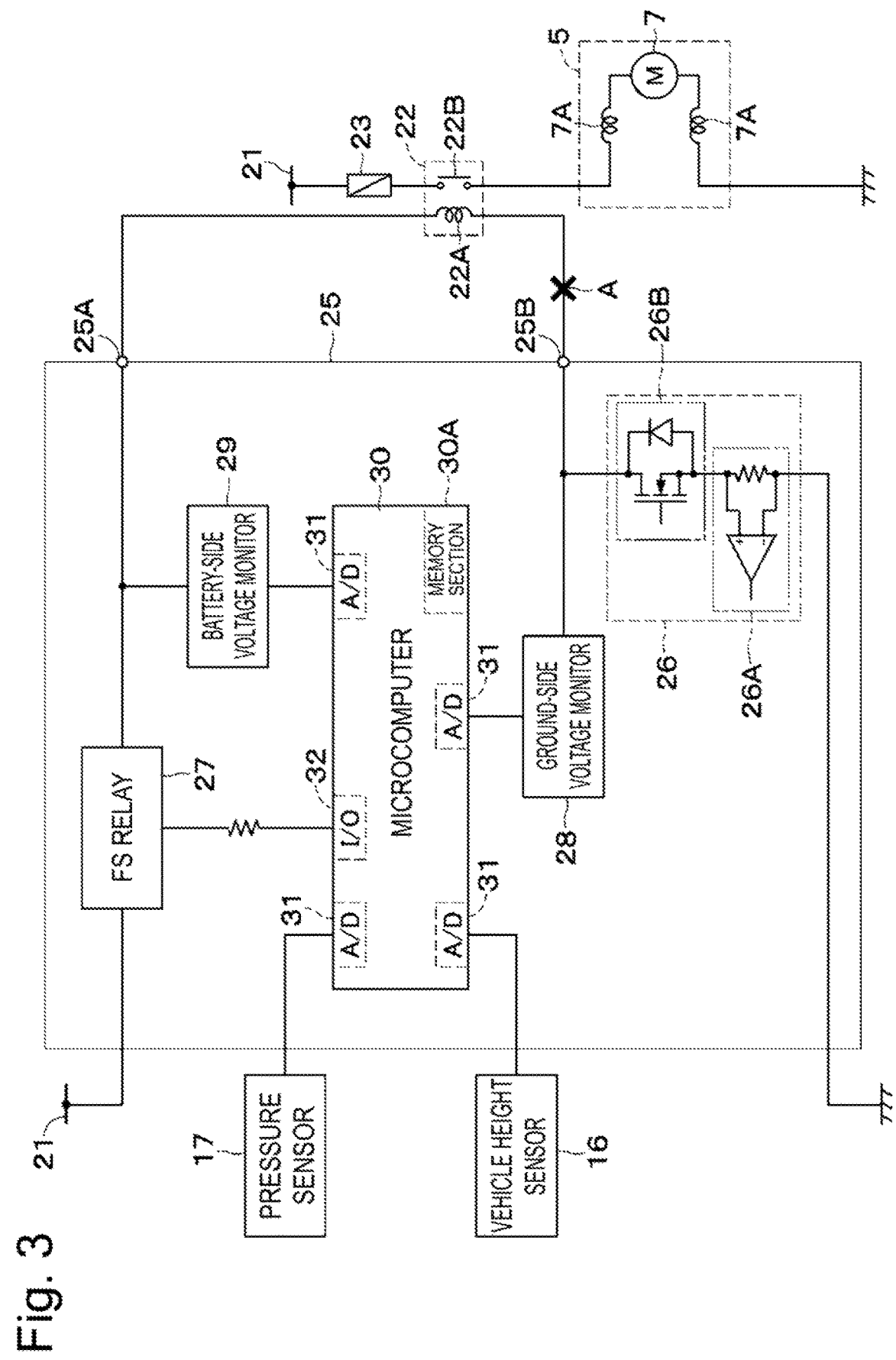
FIG. 3 is a circuit diagram showing a controller according to the first and a second embodiment of the invention.

As shown in FIG. 3, the compressor relay 22 (relay) connects the battery 21 and the air compressor module 5. The compressor relay 22 includes a coil 22A and a junction 22B. The junction 22B of the compressor relay 22 is normally off. When the coil 22A of the compressor relay 22 is supplied with current, the junction 22B is switched on. When the junction 22B is turned on, the compressor relay 22 connects the battery 21 and the electric motor 7 of the air compressor module 5.

The coil 22A is connected to the battery 21 in one end via the controller 25. The other end of the coil 22A is connected to the ground via the controller 25.

The controller 25 controls the driving of the electric motor 7 and also controls the opening and closing of the supply/exhaust valves 15 and those of the exhaust valve 12. The controller 25 includes a compressor driver 26, a fail-safe relay 27 (hereinafter, referred to as FS relay 27), voltage monitors 28 and 29, the microcomputer 30, etc.

The controller 25 has a battery-side terminal 25A which is connected to the one end of the coil 22A of the compressor relay 22. The controller 25 has a ground-side terminal 25B which is connected to the other end of the coil 22A of the compressor relay 22.

The compressor driver 26 configures a relay driving device configured to output a drive signal to the compressor relay 22. The compressor driver 26 is connected to a downstream side of the compressor relay 22. In particular, the compressor driver 26 is connected to the ground-side terminal 25B in one end and connected to the ground in the other end. The compressor driver 26 includes an overcurrent protection circuit 26A and a switching circuit 26B. The overcurrent protection circuit 26A comprises, for example, a resistor for detecting overcurrent, a comparator, etc. If overcurrent flows to the coil 22A, the overcurrent protection circuit 26A detects the overcurrent.

The switching circuit 26B includes a switching element, such as an n-type MOSFET. The switching circuit 26B is disposed, for example, so as to be connected in series to an upstream side of the overcurrent protection circuit 26A. In response to a control signal from the microcomputer 30 and a detection signal from the overcurrent protection circuit 26A, the switching circuit 26B connects or disconnects the ground-side terminal 25B to or from the ground. When the switching circuit 26B comes into connection, the compressor driver 26 supplies the coil 22A with a relay current as a drive signal.

The FS relay 27 configures another relay driving device which outputs a drive signal to the compressor relay 22. The FS relay 27 is connected to either an upstream side or the downstream side of the compressor relay 22, whichever is opposite to the compressor driver 26. In this case, the FS relay 27 is connected to the upstream side of the compressor relay 22. The FS relay 27 is configured in substantially the same manner as the compressor relay 22. The FS relay 27 is connected to the battery-side terminal 25A in one end and connected to the battery 21 in the other end. The FS relay 27 has a control terminal which is connected to an I/O port 32 of the microcomputer 30. In response to the control signal from the microcomputer 30, the FS relay 27 is switched between an ON state which connects the batter-side terminal 25A to the battery 21 and an OFF state which disconnects the battery-side terminal 25A from the battery 21.

The ground-side voltage monitor 28 is connected to the downstream side of the compressor relay 22. The ground-side voltage monitor 28 detects a voltage value Vg of the ground-side terminal 25B as a voltage value on a downstream side of the coil 22A. An input side of the ground-side voltage monitor 28 is connected in between the compressor driver 26 and the ground-side terminal 25B. An output side of the ground-side voltage monitor 28 is connected to the microcomputer 30. The ground-side voltage monitor 28 outputs to the microcomputer 30 a detection signal according to the voltage value Vg of the ground-side terminal 25B. The detection signal comprising an analogue signal, which is outputted from the ground-side voltage monitor 28, is converted into a digital signal by the A/D converter 31 installed in the microcomputer 30. The detection signal is then inputted to the microcomputer 30.

The battery-side voltage monitor 29 is connected to the upstream side of the compressor relay 22. The battery-side voltage monitor 29 detects a voltage value Vb of the battery-side terminal 25A as voltage on the upstream side of the coil 22A. An input side of the battery-side voltage monitor 29 is connected in between the FS relay 27 and the battery-side terminal 25A. An output side of the battery-side voltage monitor 29 is connected to the microcomputer 30. The battery-side voltage monitor 29 outputs to the microcomputer 30 a detection signal corresponding to the voltage value Vb of the battery-side terminal 25A. The detection signal comprising an analogue signal, which is outputted from the batter-side voltage monitor 29, is converted into a digital signal by the A/D converter 31 installed in the microcomputer 30. The detection signal is then inputted to the microcomputer 30. The voltage monitors 28 and 29 configure voltage detection devices which detect drive voltage of the compressor relay 22.

The microcomputer 30 configures a control device. The microcomputer 30 controls the drive and stop of the air compressor module 5 comprising the air compressor 6 and the electric motor. The microcomputer 30 further controls the opening and closing of the exhaust valve 12 and those of the supply/exhaust valve 15. An input side of the microcomputer 30 connected with the vehicle height sensor 16, the pressure sensor 1 and the voltage monitors 28 and 29. An output side of the microcomputer 30 is connected to the FS relay 27 and the compressor driver 26.

Figure 4:
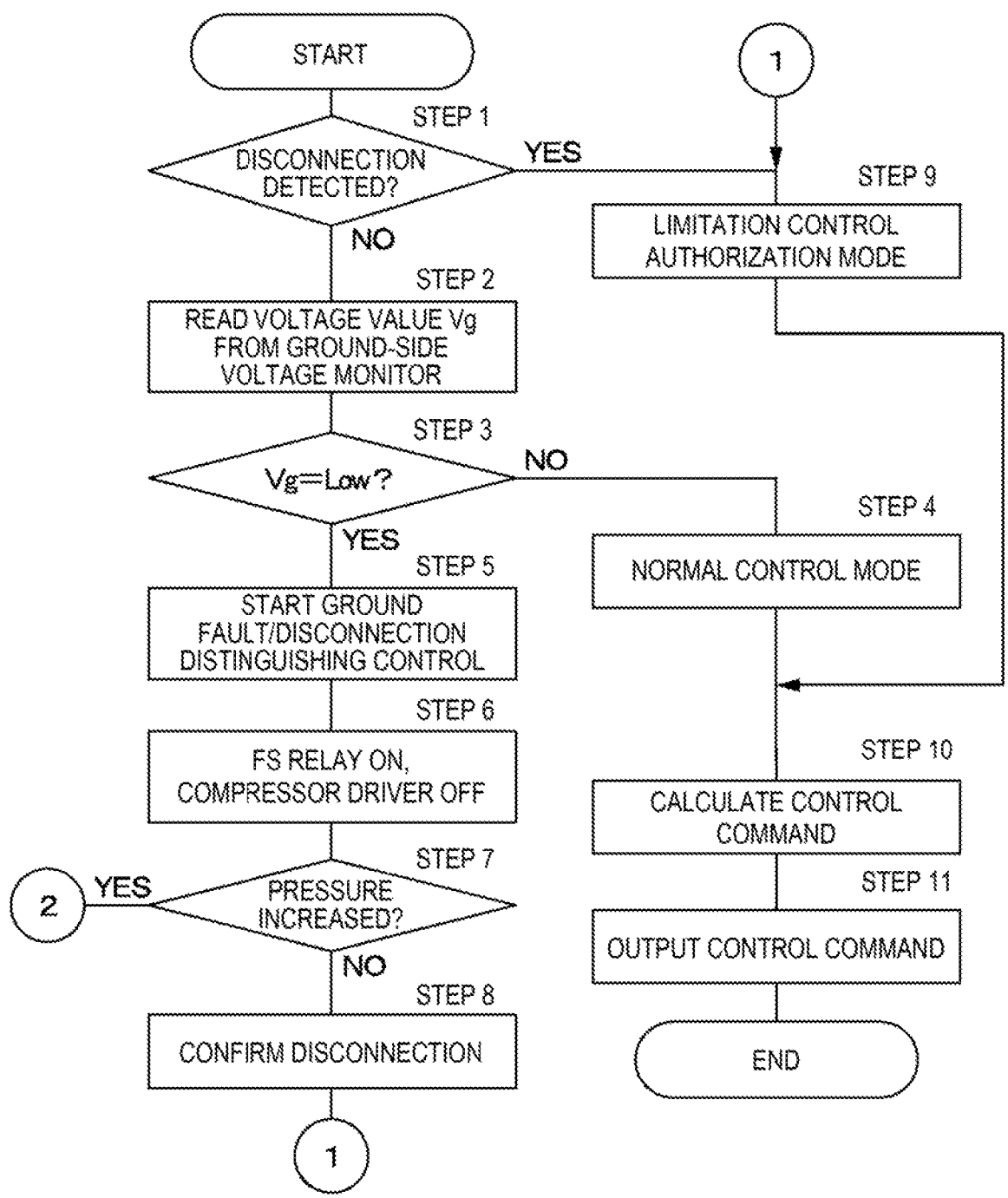
FIG. 4 is a flowchart showing air suspension control processing according to the first embodiment of the invention.
Figure 5:
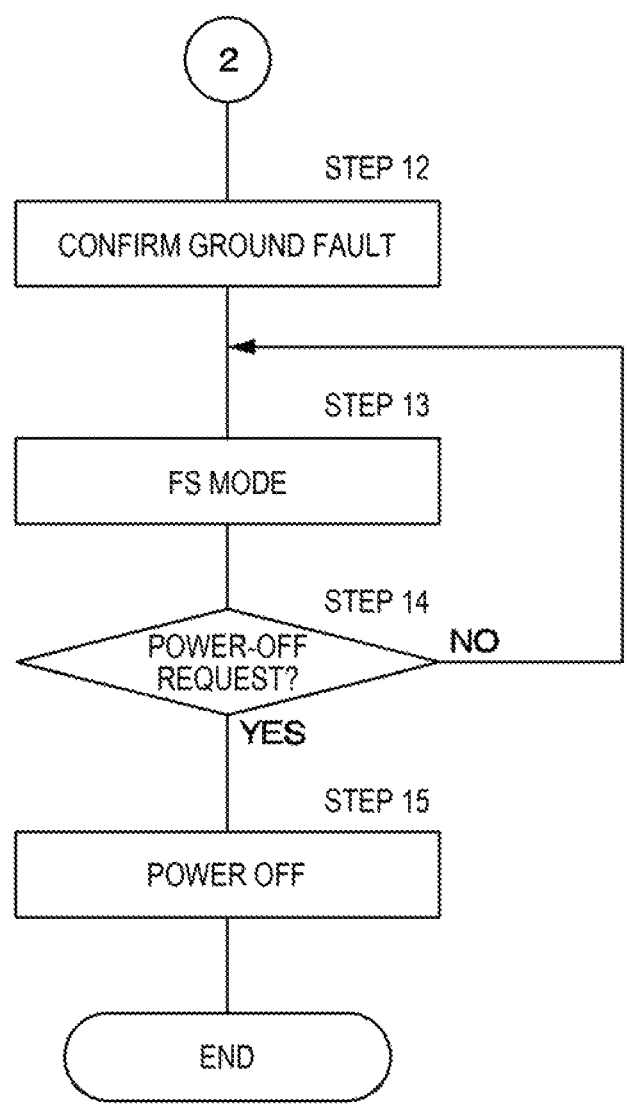
FIG. 5 is a flowchart which continues from the flowchart or FIG. 4.

The microcomputer 30 includes a memory section 30A comprising, for example, a ROM a RAM, a non-volatile memory, etc. The memory section 30A stores, for example, a program for air suspension control processing which is illustrated in FIGS. 4 and 5. The microcomputer 30 executes the program stored in the memory section 30A. The microcomputer 30 thus controls the air suspensions 3 to adjust the vehicle height of the vehicle. More specifically, the microcomputer 30 controls the current supplied to the electric motor 7 in accordance with the detection signals inputted from the vehicle height sensor 16, the pressure sensor 17, and the like. The microcomputer 30 further controls the current supplied to the solenoid 12A of the exhaust valve 12 and the current supplied to the solenoid 15A of the supply/exhaust valve 15.

The microcomputer 30 includes a failure determination device. When executing the air suspension control processing described later, the microcomputer 30 detects a ground fault of the drive signal of the compressor relay 22 distinctively from, a disconnection on the basis of the voltage value Vg detected by the ground-side voltage monitor 28 and the pressure value P detected by the pressure sensor 17.

Discussed below with reference to FIGS. 4 and 5 is the air suspension control processing including vehicle height adjustment processing by the microcomputer 30. The air suspension control processing in FIGS. 4 and 5 is repeatedly executed at preset time intervals.

A Step 1 makes a determination as to whether a disconnection is detected. For example, in failure situations of various kinds, failure codes corresponding to the respective failure situations are stored in the memory section 30A of the microcomputer 30. The microcomputer 30 reads out the failure codes from the memory section 30A and determines whether the failure code corresponding to a disconnection failure is stored. If the determination in the Step 1 is "YES," the microcomputer 30 has already detected the disconnection occurrence in connection lines including the coil 22A of the compressor relay 22. The routine then moves to a Step 9. The Step 9 executes processing for the case where a disconnection is confirmed.

If the determination in the Step 1 is "NO," the microcomputer 30 has not set detected any disconnection. The routine therefore moves to a Step 2. The FS relay 27 is brought into the ON state (connected state), and the compressor driver 26 into the OFF state disconnected state). In this state, the microcomputer 30 reads the voltage value Vg detected by the ground-side voltage monitor 28. In a subsequent Step 3, it is determined whether the voltage value Vg is Low, that is, whether the voltage value Vg of the ground-side terminal 25B is in the vicinity of the ground (0[V], for example).

At this moment, the FS relay 27 is ON, and the compressor driver 26 is OFF, so that the connection lines including the coil 22A are connected to the battery 21. In a normal state (ordinary state) where the drive signal (relay current) is supplied, the voltage value Vg of the ground-side terminal 25B is in the vicinity of supply voltage from the battery 21. In a disconnection state where the connection lines including the coil 22A are disconnected or in a ground fault state where the downstream side of the coil 22A is connected to the ground, the voltage value Vg of the ground-side terminal 25B is in the vicinity of the ground.

If the determination in the Step 3 is "NO" the voltage value Vg is in the vicinity of the supply voltage from the battery 21, meaning that the voltage value Vg is High. The connection lines including the coil 22A are therefore determined to be in the normal state, and the routine moves to a Step 4. In the Step 4, the microcomputer 30 executes a normal control mode and outputs a target value of the vehicle height in order to adjust the vehicle height of the vehicle according to the vehicle height outputted from the vehicle height sensor 16, and the like. At this point of time, the microcomputer 30 clears the failure codes relating to a disconnection failure and a short circuit failure.

A subsequent Step 10 calculates a control command for controlling the air compressor 6, the exhaust valve 12, and the supply/exhaust valve 15 in accordance with the target value of the vehicle height. The control command (control signal) calculated in the Step 10 is outputted to the compressor driver 26, the solenoid 12A of the exhaust valve 12, and the solenoid 15A of the supply/exhaust valve 15 in a Step 11. This enables the controller 25 to open or close the exhaust valve 12 and the supply-exhaust valve 15 to raise or lower the vehicle height of the vehicle to the target value while the air compressor 6 is in operation or at rest.

If the determination of the Step 3 is "YES," the voltage value Vg is in the vicinity of the ground, which means that the voltage value Vg is Low. It is then determined that there is a disconnection or a ground fault in the connection lines including the coil 22A. The routine therefore moves to the Step 5. The Step 5 starts ground fault/disconnection distinguishing control. The microcomputer 30 closes both the exhaust valve 12 and the supply/exhaust valve 15 in response to the control, signal outputted to the solenoids 12A and 15A. In a subsequent Step 6, the microcomputer 30 turns on the FS relay 27 and turns off the compressor driver 26.

A Step 7 makes a determination as to whether the pressure value P detected by the pressure sensor 17 has been increased. To be more specific, the microcomputer 30 determines whether the pressure value P has been increased beyond a predetermined pressure difference ΔP since the beginning of the ground fault/disconnection distinguishing control. Alternatively, the microcomputer 30 may determine whether the pressure value P has been increased beyond, for example, a predetermined threshold value, instead of the pressure difference ΔP.

If the determination of the Step 7 is "NO," the connection lines including the coil 22A are determined to be disconnected. It is therefore also determined that the compressor relay 22 is in the OFF state, and thus that the air compressor 6 is at rest. The routine moves to a Step 8. The Step 8 executes disconnection confirming processing and stores the failure code corresponding to a disconnection into the memory section 30A.

In the subsequent Step 9, the microcomputer 30 executes a limitation control authorization mode and controls the vehicle height adjustment only if the situation is likely to render the vehicle defective. For example, if the vehicle height is high while the vehicle is traveling on an expressway, the vehicle height needs to be lowered, to improve the driving stability of the vehicle. For another example, if the vehicle is unloaded in a garage, and the vehicle height is raised to make the vehicle contact the ceiling of the garage, it is necessary to lower the vehicle height. The microcomputer 30 then outputs the target value of the vehicle height in order to adjust the vehicle height of the vehicle according to the vehicle height outputted from the vehicle height sensor 16, and the like. The routine then moves to the Step 10. The Step 10 calculates the control command for controlling the air compressor 6, the exhaust valve 12, and the supply/exhaust valve 15 on the basis of the target value. The control command (control signal) calculated in the Step 10 is outputted by the Step 11 to the compressor driver 26, the solenoid 12A of the exhaust valve 12, and the solenoid 15A of the supply/exhaust valve 15. This enables the controller 25 to implement air exhaustion control which opens the exhaust valve 12 and the supply/exhaust valve 15, and lower the vehicle height of the vehicle to the target value while the air compressor 6 is at rest.

If the determination of the Step 7 is "YES," the air compressor 6 is in operation. It is therefore determined that the downstream side of the coil 22A is connected to the ground, and that there is the ground failure. The routine then moves to a Step 12. If the Step 12 executes ground failure confirming processing and stores the failure code corresponding to a ground failure in the memory section 30A.

A subsequent Step 13 executes a fail-safe mode (hereinafter, referred to as an FS mode) and opens the exhaust valve 12 to reduce the pressure value P in the discharge side of the air compressor 6 to a predetermined value which is previously determined. For example, when the pressure value P is decreased to the predetermined value or after the exhaust valve 12 is open for a predetermined time period, the microcomputer 30 outputs a power-off request for discontinuing the power supply from the battery 21. The vehicle height needs to be raised if the compressed air in the air springs 4 has predetermined or lower pressure or if a vehicle bottom touches snow on a road. The FS mode implements control for raising the vehicle height to a limited extent if the vehicle height is lower than a predetermined value or if the vehicle bottom touches a road surface or stones. To be more precise, the microcomputer 30 outputs the target value of the vehicle height in order to adjust the vehicle height of the vehicle according to the vehicle height, outputted from the vehicle height sensor 16, and the like. The microcomputer 30 then opens the supply exhaust valve 15 to turn on the FS relay 27 and thus implements air supply control. This makes it possible to raise the vehicle until the target value is reached.

A Step 14 makes a determination as to whether the power-off request has been outputted. If the determination of the Step 14 is "NO," the processing of the Step 13 is continued. If the determination of the Step 14 is "YES," the power off request has been outputted, and therefore, the routine moves to a Step 15. In the Step 15, the microcomputer 30 outputs a control signal to the FS relay 27 and switches the FS relay 21 into an OFF state (disconnected state), resulting in a disconnection between the upstream side of the coil 22A and the battery 21. The coil 22A of the compressor relay 22 is accordingly not supplied with power even in a ground fault state, which turns off the compressor relay 22 and stops the air compressor 6.

A detection behavior of the microcomputer 30 for detecting a ground fault and a disconnection will be now explained with reference to FIGS. 3 and 6.

If both the compressor driver 26 and the FS relay 2 are turned or in the ordinary state (normal state), a normal current 10 [A] flows to the coil 22A of the compressor relay 22 to turn on the compressor relay 22, driving the air compressor 6. This allows the compressed air to be supplied from the air compressor module 5 to the air suspensions 3. If the compressor driver 26 is switched off, the coil 22A of the compressor relay 22 is not supplied with current, which turns off the compressor relay 22 and slops the air compressor 6.

Let us assume, for example, that a ground fault or a disconnection has occurred in the middle ("A" point on FIG. 3) between the coil 22A and the ground-side terminal 25B, which is located on the downstream, side of the coil 22A of the compressor relay 22. Regardless of whether what has occurred is a ground fault or a disconnection, the voltage on the downstream side of the coil 22A of the compressor relay 22 becomes 0[V]. The microcomputer 30 therefore detects the occurrence of a ground fault or a disconnection on the basis of the voltage value Vg detected, by the ground-side voltage monitor 28.

When making a failure determination, the microcomputer 30 turns on the FS relay 27 and turns off the compressor driver 26. As shown in FIG. 6, in the ordinary state where the drive signal of the compressor relay 22 is normal, the voltage value Vg detected by the ground-side voltage monitor 28 is in the vicinity of supply voltage from the battery 21, meaning that the voltage value Vg is High. In the case of either a ground fault or a disconnection, the voltage value Vg detected by the ground-side voltage monitor 28 comes close to 0[V], which means that the voltage value Vg becomes Low. Therefore, when the voltage value Vg detected by the ground-side voltage monitor 28 becomes Low, it can be determined that either a ground fault or a disconnection has occurred.

When a ground fault occurs, a ground-limit current If1[A] flows to the coil 22A of the compressor relay 22 to turn on the compressor relay 22. She air compressor 6 is driven even if the vehicle height adjustment control is not carried out (the supply/exhaust valve 15 and the exhaust valve 12 are closed). This increases the pressure value P in a discharge-side portion of the air compressor 6 within the air compressor module 5.

In the event of a disconnection, current does not flows to the coil 22A of the compressor relay 22, so that the compressor relay 22 comes into the OFF state. Since the air compressor 6 is suspended in such a case, the pressure value P is not increased unlike in the ease of ground faults. The microcomputer 30 thus detects a ground fault and a disconnection distinctively from each other on the basis of whether or not the pressure value P is increased.

In this way, according to the air suspension system of the first embodiment, the microcomputer 30 detects a ground fault of the drive signal of the compressor relay 22 distinctively from a disconnection on the basis of the voltage value Vg detected by the ground-side voltage monitor 28 and the pressure value P detected by the pressure sensor 17. The air suspension system is capable of distinguishing between a ground fault failure and a disconnection failure when a failure occurs in the drive signal of the compressor relay 22. This reduces a cost burden at repair plants.

The microcomputer 30 detects a ground fault failure and a disconnection failure distinctively from each other on the basis of the voltage value Vg detected by the ground-side voltage monitor 28 and the pressure value P detected by the pressure sensor 17 without using current which can be used as a drive signal of the compressor relay 22. This eliminates the necessity of installation of a current monitor circuit in an electronic control unit (ECU) which comprises the controller 25 and the other devices. It is then possible to reduce a unit cost of the ECU and thus cut the production cost.

The compressor driver 26 and the ground-side voltage monitor 28 are connected to the downstream side of the compressor relay 22. The microcomputer 30 detects a disconnection and a ground fault of the drive signal of the compressor relay 22 distinctively from each other. Therefore, if the compressor driver 26 is turned off while the upstream side of the compressor relay 22 is connected to the battery 21, this makes it possible to detect the occurrence of a disconnection failure or a ground fault failure of the drive signal of the compressor relay 22 on the basis of the voltage value Vg detected by the ground-side voltage monitor 28.

In addition, if the compressor driver 26 is turned off while the upstream side of the compressor relay 22 is connected to the battery 21, the compressor relay 22 comes into either the ON state or the OFF state, depending on whether a failure is a disconnection or a ground fault. This enables the microcomputer 30 to detect a disconnection and a ground fault of the drive signal of the compressor relay 22 distinctively from each other on the basis of whether or not the pressure value P detected by the pressure sensor 17 is increased.

Upon detection of a disconnection, the microcomputer 30 implements control for lowering the vehicle height of the vehicle. If a disconnection occurs in the drive signal of the compressor relay 22, the air compressor 6 cannot be driven. However, the air exhaustion control can be implemented to discharge the compressed air from the air suspensions 5. This makes it possible to implement the vehicle height control for lowering the vehicle height according to vehicle conditions.

Upon detection of a ground fault, the microcomputer 30 turns on the FS relay 27, which allows the air compressor 6 to be driven. This makes it possible to implement the vehicle height control for raising or lowering the vehicle height according to vehicle conditions.

Figure 7:
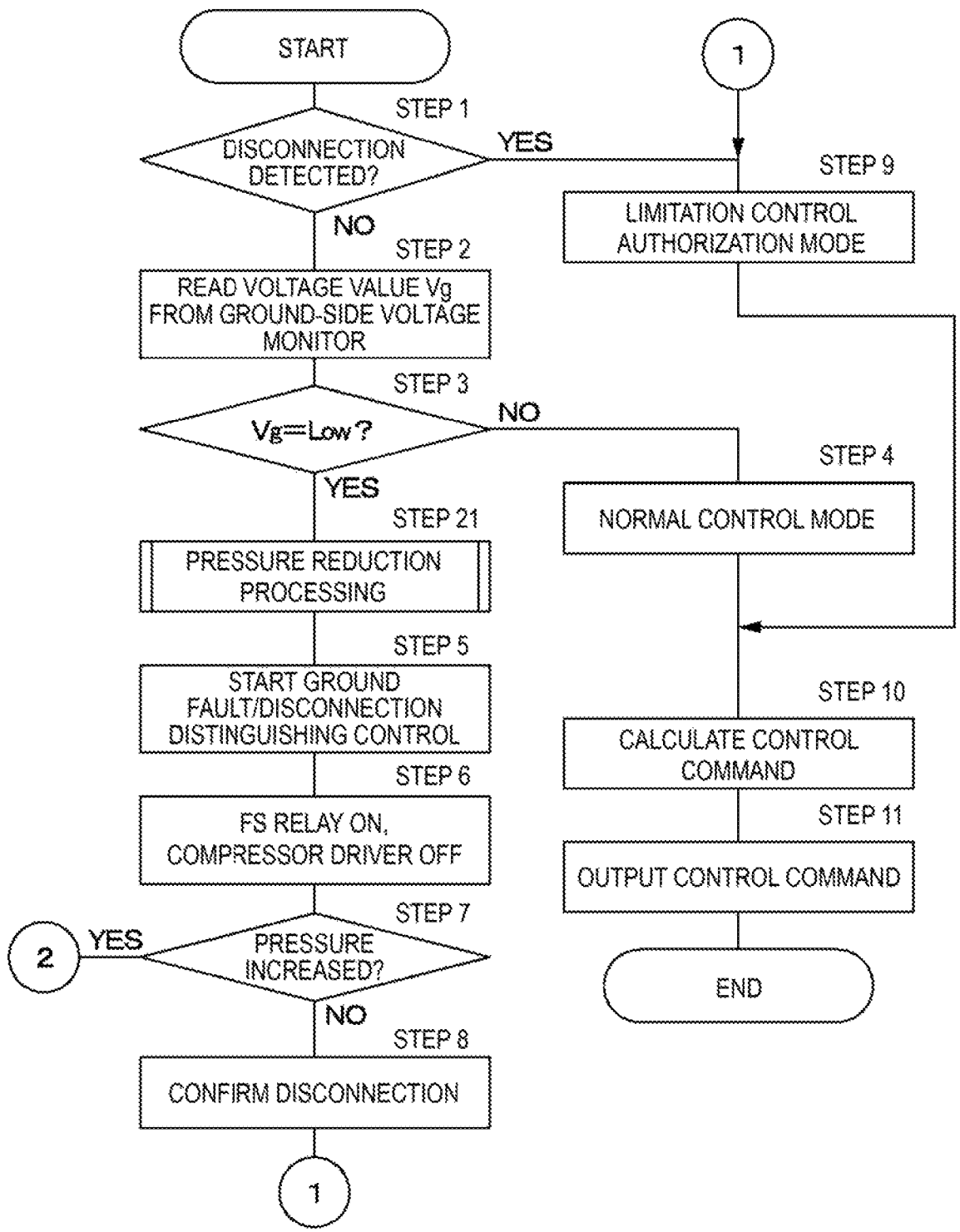
FIG. 7 is a flowchart showing air suspension control processing according to the second embodiment of the invention.
Figure 8:
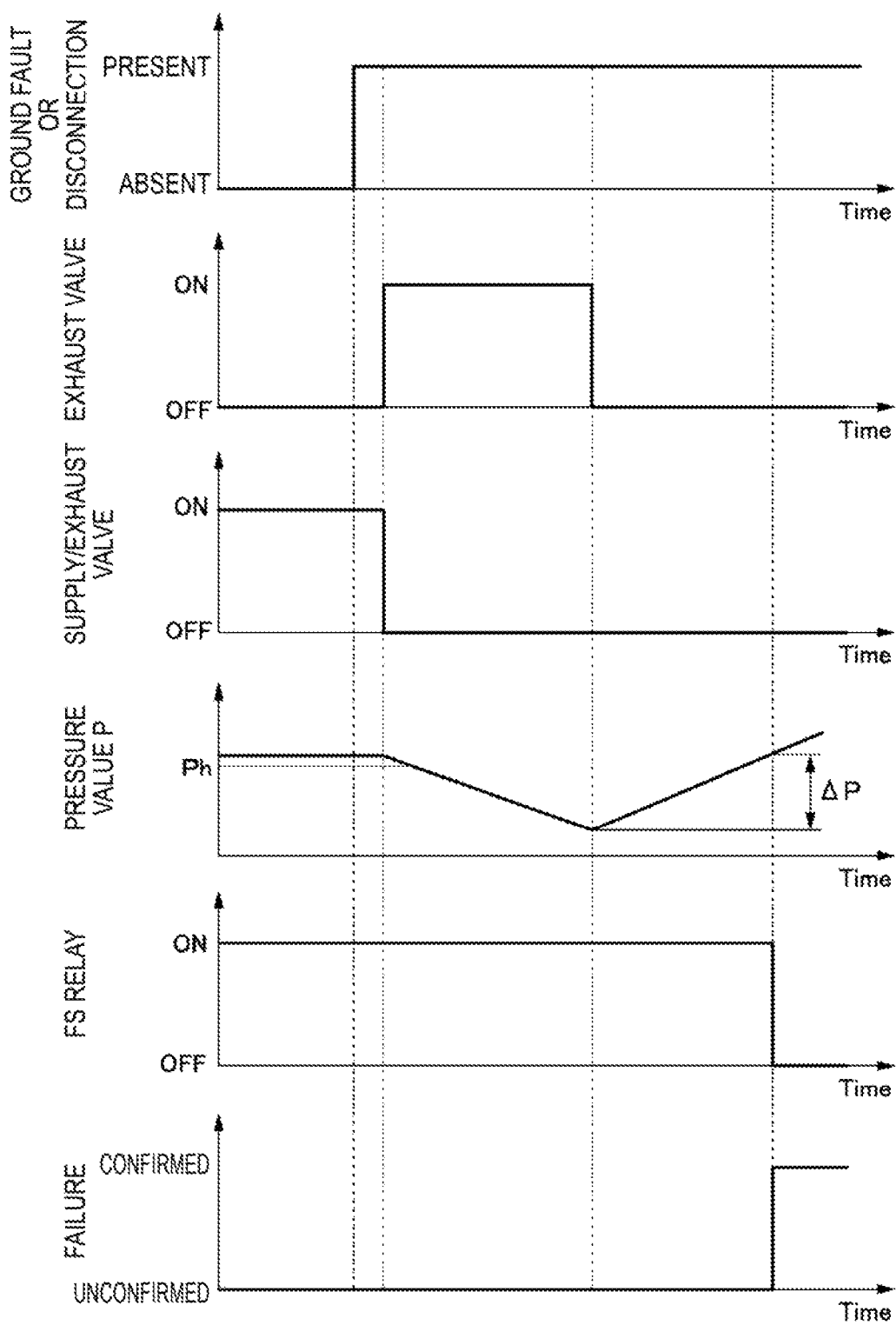
FIG. 8 is a timing chart showing the presence of a ground fault or a disconnection, an exhaust valve, a supply/exhaust valve, a pressure value, an FS relay, and a determination result of a failure, according to the second embodiment of the invention.

FIGS. 3, 7 and 8 show a second embodiment of the invention. The second embodiment is characterized in that a pressure value in a discharge side of an air compressor is previously reduced at the time of detecting a ground fault and a disconnection distinctively from each other. In the second embodiment, the same constituent elements as those of the first embodiment will be provided with the same reference marks, and description thereof will be omitted.

FIG. 7 shows a part of air suspension control processing according to the second embodiment. As in the first embodiment a microcomputer 30 repeatedly executes the air suspension control processing shown in FIGS. 7 and 5 at preset time intervals.

The air suspension control processing of the second embodiment is substantially the same as the air suspension control processing of the first embodiment. However, in the second embodiment, if the determination of the Step 3 is "YES," pressure reduction processing of a Step 21 is executed before the start of the ground fault/disconnection distinguishing control in the Step 5. In this respect, the second embodiment differs from the first.

In the pressure reduction processing of the Step 21, the microcomputer 30 makes a determination as to whether a pressure value P in a discharge side of an air compressor 6 is higher than a predetermined upper limit Ph. If the pressure value P is higher than the upper limit Ph, initial air exhaustion control is implemented to reduce the pressure value P to, for example, a value that is roughly equal to atmospheric pressure. More specifically, the initial air exhaustion control opens an exhaust valve 12 with a supply/exhaust valve 15 closed. Compressed air is thus discharged from the discharge side of the air compressor 6, and the pressure-value P detected by a pressure sensor 17 is accordingly reduced. When the pressure value P is reduced to a predetermined value which is previously determined or after the exhaust valve 12 is open for a predetermined time period, the routine moves to the Step 5. The microcomputer 30 closes both the exhaust valve 12 and the supply/exhaust valve 15 and starts the ground fault/disconnection distinguishing control.

According to the second embodiment, the pressure reduction processing described above is executed when the ground fault/disconnection distinguishing control is implemented. This pressure reduction processing, as shown in FIG. 8, reduces initial pressure (pressure value P) in the discharge side of the air compressor 6 to pressure which, is substantially equal to the atmospheric pressure or pressure in a standard state, through the air exhaustion control. An FS relay 27 is then turned on, and a compressor driver 26 is turned off while the exhaust valve 12 and the supply/exhaust valve 15 are both closed. This causes a significant change in the pressure value P in the discharge side of the air compressor 6 in the event of a ground fault, as compared to when the pressure value P is high. This facilitates the detection of an increase in the pressure value P in the discharge side of the air compressor 6.

In this way, the second embodiment also provides substantially the same operation and advantageous effects as those of the first embodiment. If the pressure value P is too high, a change in pressure is minor even if the air compressor 6 is driven, which deteriorates accuracy in distinction between the ground fault and the disconnection. The second embodiment reduces the pressure value P in the discharge side of the air compressor 6 before starting the ground fault/disconnection distinguishing control. This reduction of the pressure value P makes significant a change in the pressure value P, which takes place with pressure increase, in the case where the air compressor 6 is driven due to the occurrence of a ground fault failure. This can improve a ground fault detection accuracy.

Figure 9:
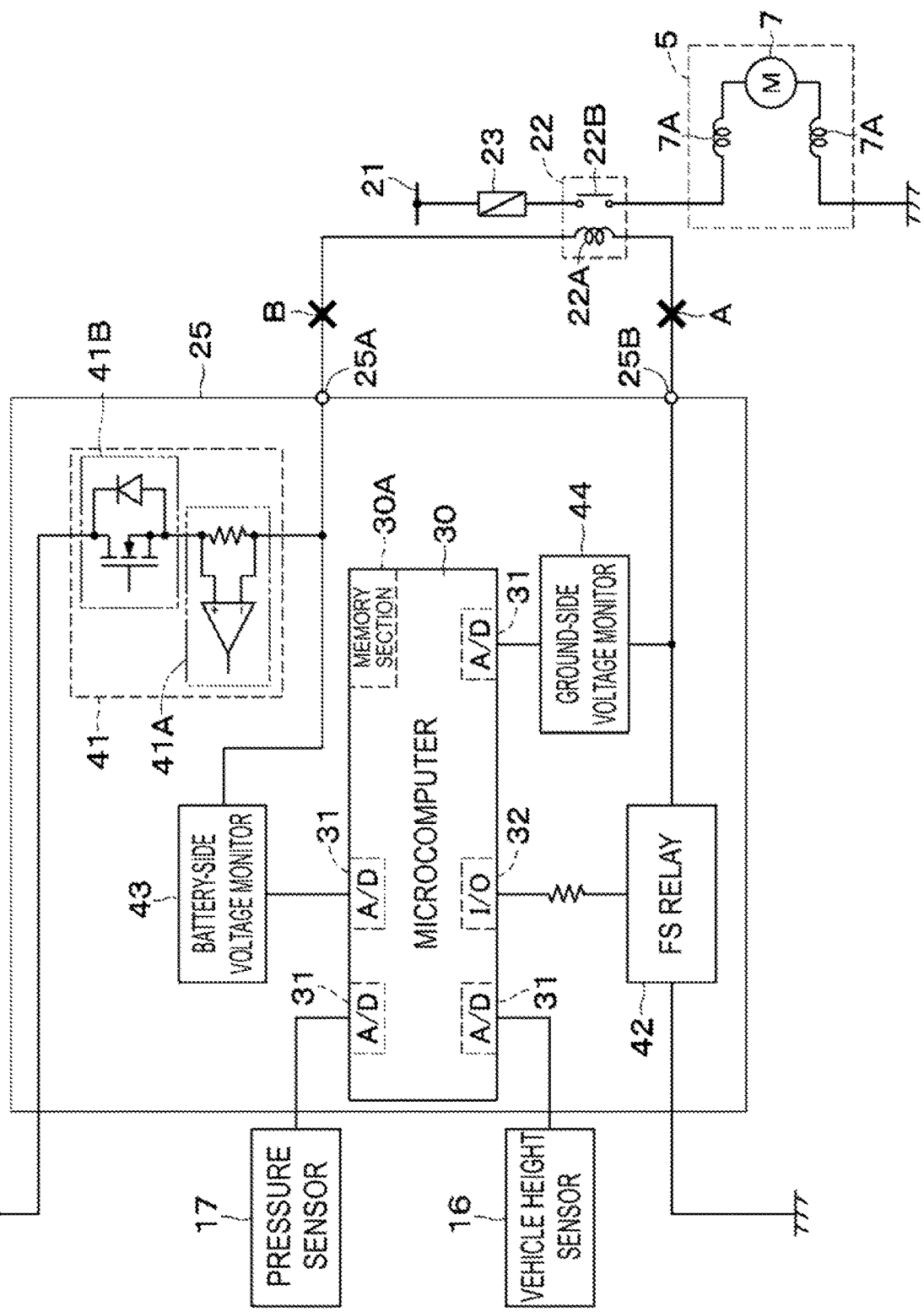
FIG. 9 is a circuit diagram showing a controller according to third and fourth embodiments of the invention.
Figure 10:
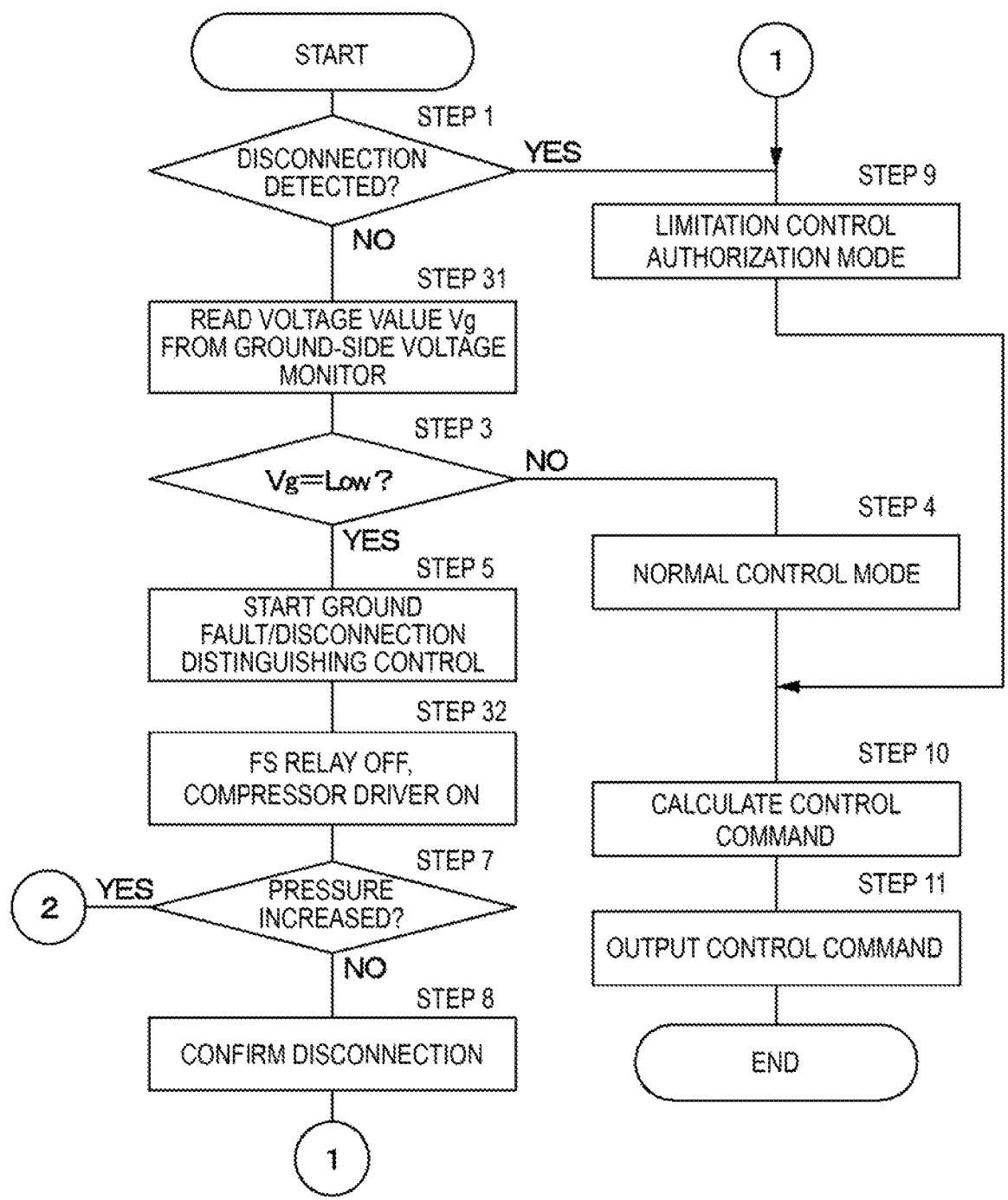
FIG. 10 is a flowchart showing air suspension control processing according to the third embodiment of the invention.

FIGS. 9 to 11 show a third embodiment of the invention. The third embodiment is characterized in that a compressor driver and a battery-side voltage monitor are connected to an upstream side of a compressor relay. In the third embodiment, the same constituent elements as those of the first embodiment are provided with the same reference marks, and description thereof will be omitted.

A compressor driver 41 configures a relay driving device which outputs a drive signal to a compressor relay 22. The compressor driver 41 is connected to an upstream side of the compressor relay 22. To be more specific, the compressor driver 41 is connected to a battery-side terminal 25A in one end, and is connected to a battery 21 in the other end. The compressor driver 41 is configured in the same manner as a compressor driver 26 of the first embodiment. The compressor driver 41 includes an overcurrent protection circuit 41A and a switching circuit 41B. When overcurrent flows to a coil 22A, the overcurrent protection circuit 41A detects the overcurrent. The switching circuit 41B connects or disconnects the battery-side terminal 25A to or from the battery 21 in accordance with a control signal from the microcomputer 30 and a detection signal from the overcurrent protection circuit 41A.

A fail-safe relay 42 (hereinafter, referred to as an FS relay 42) configures another relay driving device which outputs a drive signal to the compressor relay 22. The FS relay 42 is connected to either the upstream side or a downstream side of the compressor relay 22, whichever is opposite to the compressor driver 41. In this case, the FS relay 42 is connected to the downstream side of the compressor relay 22. The FS relay 42 is connected to a ground-side terminal 25B in one end, and is connected to the ground in the other end. The FS relay 42 has a control terminal connected to an I/O port 32 of the microcomputer 30. In response to the control signal from the microcomputer 30, the FS relay 42 is switched between an ON state which connects the ground-side terminal 25B to the ground and an OFF state which disconnects the ground-side terminal 25B from the ground.

The battery-side voltage monitor 43 is connected to the upstream side of the compressor relay 22. The battery-side voltage monitor 43 detects a voltage value Vb of the battery-side terminal 25A as voltage on an upstream side of the cod 22A. An input side of the battery-side voltage monitor 43 is connected in between the FS relay 42 and the battery-side terminal 25A. An output side of the battery-side voltage monitor 43 is connected to the microcomputer 30 via an A/D converter 31. The battery-side voltage monitor 43 outputs to the microcomputer 30 a detection signal corresponding to the voltage value Vb of the battery-side terminal 25A.

A ground-side voltage monitor 44 is connected to the downstream side of the compressor relay 22. The ground-side voltage monitor 44 detects a voltage value Vg of the ground-side terminal 25B as a voltage value on a downstream side of the coil 22A. An input side of the ground-side voltage monitor 44 is connected in between the compressor driver 26 and the ground-side terminal 25B. An output side of the ground-side voltage monitor 44 is connected to the microcomputer 30 via the A/D converter 31. The ground-side voltage monitor 44 outputs to the microcomputer 30 a detection, signal corresponding to the voltage value Vg of the ground-side terminal 25B. The voltage monitors 43 and 44 configure voltage detection devices which detect the drive voltage of the compressor relay 22.

Air suspension control processing including vehicle height adjustment, processing by the microcomputer 30 will be explained below with reference to FIG. 10.

FIG. 10 shows a part of the air suspension control processing according to the third embodiment. As in the first embodiment, the microcomputer 30 repeatedly executes the air suspension control processing shown in FIGS. 10 and 5 at preset time intervals.

The air suspension control processing of the third embodiment is substantially the same as the air suspension control processing of the first embodiment. However, the connecting location of the FS relay 42 and the compressor driver 41 in the third embodiment is opposite to that of the FS relay 27 and the compressor driver 26 in the first embodiment. The FS relay 42 is connected to the downstream side of the coil 22A, whereas the compressor driver 41 is connected to the upstream side of the coil 22A. Accordingly, the third embodiment executes Steps 31 and 32, instead of the Steps 2 and 6 executed by the first embodiment. In this respect, the third embodiment differs from the first.

In the Step 31, the FS relay 42 is brought into an OFF state (disconnected state), and the compressor driver 41 into an ON state (connected state). In this state, the microcomputer 30 reads the voltage value Vg detected by the ground-side voltage monitor 44. The Step 3 and subsequent processing are then executed.

If the determination of the Step 3 is "YES," the routine moves to the Step 5. The Step 5 starts the ground fault/disconnection distinguishing control. In a subsequent Step 32, the microcomputer 30 turns off the FS relay 42 and turns on the compressor driver 41. The Step 7 and subsequent processing are then executed.

A detection behavior of the microcomputer 30 for detecting ground faults and disconnections will be now explained with reference to FIGS. 9 and 11.

When making the failure determination, the microcomputer 30 turns off the FS relay 42 and turns on the compressor driver 41. As shown in FIG. 11, in an ordinary state where the drive signal of the compressor relay 22 is normal, the voltage value Vg detected by the ground-side voltage monitor 44 is High. On the other hand, for example, if a ground fault or a disconnection occurs in the middle ("A" point on FIG. 9) between the coil 22A and the ground-side terminal 25B, the voltage value Vg detected by the ground-side voltage monitor 44 comes close to 0[V], which means that the voltage value Vg becomes Low. When the voltage value Vg detected by the ground-side voltage monitor 44 becomes Low, this allows the detection of a ground-fault or disconnection occurrence.

When a ground fault occurs, a ground fault current If1 flows to the coil 22A to turn on the compressor relay 22. In the ground fault state, therefore, an air compressor 6 is driven, which increases the pressure value P in a discharge side portion of the air compressor 6. In the event of a disconnection, the compressor relay 22 is maintained in the OFF state, in the disconnection state, therefore, the air compressor 6 is suspended, so that the pressure value P is not increased. The microcomputer 30 thus can detect a ground fault and a disconnection distinctively from each other on the basis of whether or not the pressure value P is increased.

In this way, the third embodiment can provide substantially the same operation and advantageous effects as the first embodiment. The third embodiment is applicable to the second embodiment.

FIGS. 9 and 12 to 14 show a fourth embodiment of the invention, the fourth embodiment is characterized in that a supply fault and a disconnection are detected distinctively from each other, in the fourth embodiment, the same constituent elements as those of the first and third embodiments will be provided with the same reference marks, and description thereof will be omitted.

Figure 12:
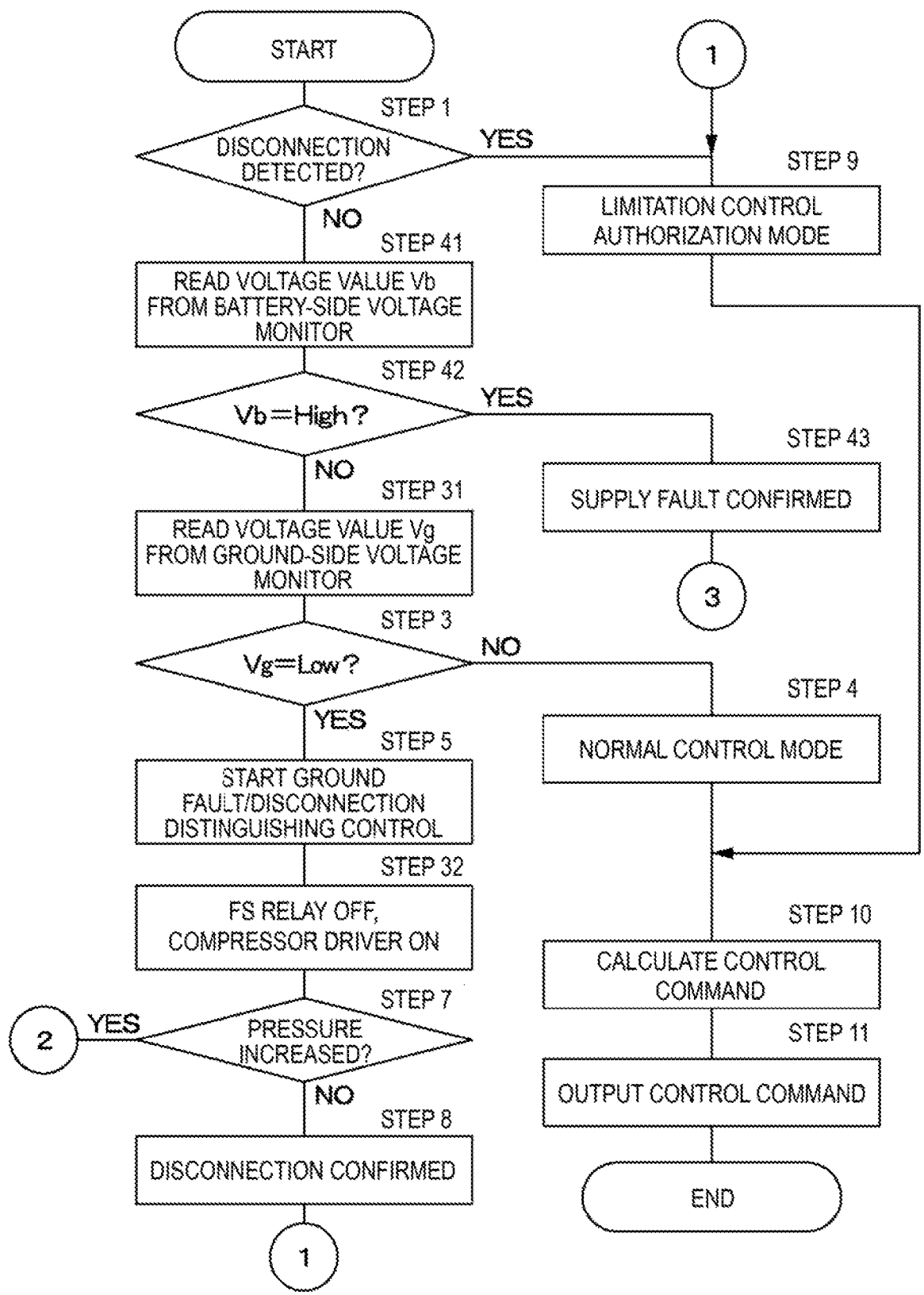
FIG. 12 is a flowchart showing air suspension control processing according to the fourth embodiment of the invention.
Figure 13:
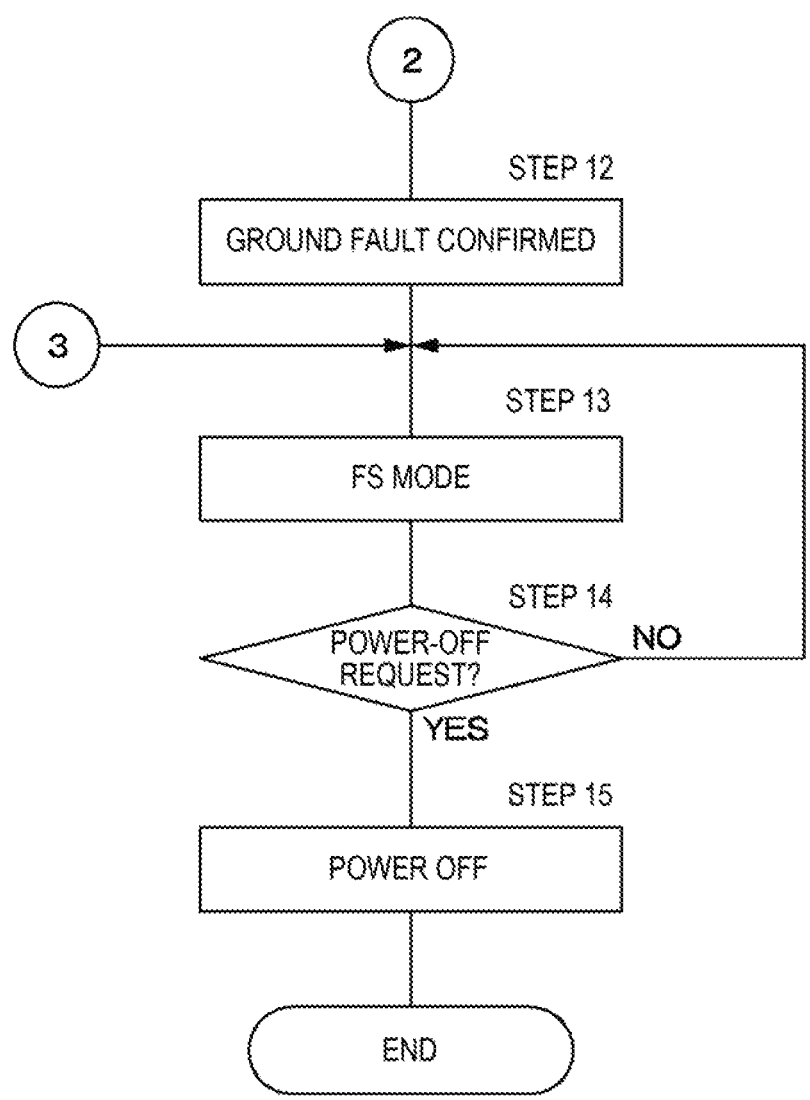
FIG. 13 is a flowchart which continues from the flowchart of FIG. 12.

FIGS. 12 and 13 show air suspension control processing according to the fourth embodiment. As in the third embodiment, a microcomputer 30 repeatedly executes the air suspension control processing shown in FIGS. 12 and 13 at preset time intervals.

The air suspension control processing of the fourth embodiment is substantially the same as the air suspension control processing of the third embodiment. According to the fourth embodiment, however, if the determination of the Step 1 is "NO," processing of Steps 41 and 42 or another processing is executed to determine whether there is a supply fault before the voltage value Vg is read from the ground-side voltage monitor 44 in the Step 31. In this respect, the fourth embodiment differs from the third.

In the Step 41, the FS relay 42 is brought into an ON state (connected state), and the compressor driver 41 into an OFF state (disconnected state). In this state, the microcomputer 30 reads the voltage value Vb detected by the battery-side voltage monitor 43.

A subsequent Step 42 makes a determination as to whether the voltage value Vb is High, that is, whether the voltage value Vb of the battery-side terminal 25A is in the vicinity of a supply voltage from a battery 21.

At this point of time, the FS relay 42 is in the ON state, and the compressor driver 41 is in the OFF state. The battery-side terminal 25A and the battery 21 are therefore disconnected from each other. In the ordinary state, the ground fault state, and the disconnection slate, the voltage value Vb of the battery-side terminal 25A is in the vicinity of the ground (0[V], for example), in the supply fault state where an upstream side of a coil 22A is short-circuited to the battery 21, the voltage value Vb of the battery-side terminal 25A is in the vicinity of the supply voltage from the battery 21.

If the determination of the Step 42 is "NO," the voltage value Vb is Low and is in the vicinity of the ground. The circuit is then determined not to be in the supply fault state. The Step 31 and subsequent processing are then executed to determine whether the circuit is in the ordinary state, the disconnection state or the ground fault state.

If the determination of the Step 42 is "YES," the voltage value Vb is in the vicinity of the supply voltage from the battery 21, which means that the voltage value Vb is High. It is therefore determined that the upstream side of the coil 22A is connected to the battery 21, and that there is a supply fault. The routine moves to a Step 43. The step 43 executes supply fault confirmation processing and stores a failure code corresponding to a supply fault in the memory section 30A. Thereafter, fail-safe processing of the Step 13 and the subsequent steps are executed as in the case of ground faults.

A detection behavior of the microcomputer 30 for detecting supply faults will be now explained with reference to FIGS. 9 and 14.

Let us assume for example, that a supply limit or a disconnection has occurred in the middle ("B" point on FIG. 9) between the coil 22A and the battery-side terminal 25A, which is located on the upstream side of the coil 22A of the compressor relay 22. If what has occurred is a disconnection, the voltage value Vb detected by the battery-side voltage monitor 43 comes close to 0[V] from the battery 21 by turning off the compressor driver 41, which means that the voltage value Vb becomes Low, as in the normal state or the ground fault state. If it is a supply fault which has occurred, however, the voltage value Vb detected by the battery-side voltage monitor 43 comes close to the supply voltage from the battery 21, which means that the voltage value Vb becomes High.

When making a supply fault determination, the microcomputer 30 turns on the FS relay 42 and turns off the compressor driver 41. As shown in FIG. 14, the voltage value Vb is Low in an ordinary state where the drive signal of the compressor relay 22 is normal. The voltage value Vb is Low also in the case of either ground limits or disconnections.

In the event of a supply fault, however, the voltage value Vb becomes High. At this point of time, a supply fault current If2[A] flows to the coil 22A of the compressor relay 22, which turns on the compressor relay 22. When the voltage value Vb detected by the battery-side voltage monitor 43 becomes High, it is determined that there is a supply fault. In this way, the microcomputer 30 can detect a supply fault and a disconnection distinctively from each other on the basis of the voltage value Vb detected by the battery-side voltage monitor 43.

As described above, the fourth embodiment provides substantially the same operation and advantageous effects as the first embodiment. The fourth embodiment further makes it possible to detect a supply fault and a disconnection distinctively from each other. When a supply fault failure is detected, the FS relay 42 placed on the downstream side of the compressor relay 22 is brought into the OFF state (disconnected state), which makes it possible to avoid wasting the power of the battery 21.

The fourth embodiment has been discussed with the example where the fourth embodiment is applied to the third. However, the fourth embodiment may be applied to the first and second embodiments. The fourth embodiment is designed to detect the three kinds of states including a supply fault, a ground fault, and a disconnection, distinctively from one another. However, the invention is not limited to such a configuration, and may be configured to, for example, detect a supply fault and a disconnection distinctively from each other without detecting ground faults. Such a configuration may be applied to the first and second embodiments.

The embodiments have explained specific examples of failure determination devices by referring to the Steps 5 to 8, 12 and 41 to 43 shown in FIGS. 4, 5, 7, 10, 12 and 13.

According to the embodiments, the air suspensions 3 are provided to all the wheels 2A to 2D, that is, the left front, right front, left rear, and right rear wheels. However, the invention is not limited to such a configuration, and the air suspensions may be provided to only the front or rear wheels.

The embodiments have been discussed, taking as an example the pneumatic suspension system including the air compressor module 5 as a fluid power pump, and the air suspensions 3 as fluid power suspension bodies. The invention is not limited to such a configuration. The invention may be applied to, for example, a hydraulic suspension system including a hydraulic pump as a fluid power pump, and a hydraulic damper and a hydraulic cylinder as fluid power suspension bodies. In such a case, instead of the compressor relay, a pump relay is utilized, which connects the electric motor for driving the hydraulic pump to the battery.

According to the embodiments, the vehicle height sensor 16 is used as the vehicle behavior detection device. However, the vehicle behavior detection device may be any device as long as it detects the behavior of the vehicle. Conceivable vehicle behavior detection devices include an acceleration sensor for detecting accelerations in up-down, forward-rearward, and right-left directions, an angular velocity sensor for detecting a roll and a pitch, and other devices.

The embodiments have been discussed with reference to the case in which the air suspension system of the invention is applied to a vehicle, such as a four-wheeled vehicle, the invention is not limited to such a configuration and may be applied to other vehicles including rail vehicles.

Inventions included in the above-discussed embodiments will be described below. According to the invention, the control device includes the failure determination device configured to detect at least either one of a supply fault and a ground fault of the drive signal of the relay distinctively from a disconnection on the basis of the voltage value detected by the voltage detection device and the pressure value detected by the pressure detection device. If a failure occurs in the drive signal of the relay, it is possible to distinguish between a ground fault failure and a disconnection failure. This reduces a cost burden at repair plants.

The invention is also capable of distinguishing between a ground fault failure and a disconnection failure on the basis of the voltage value detected by the voltage detection device and the pressure value detected by the pressure detection device without using current functioning as the drive signal of the relay. This eliminates the necessity of installation of a current monitor circuit in the control device, which reduces production costs.

According to the invention, the relay driving device and the voltage detection device are connected to the downstream side of the relay. The failure determination device detects a disconnection and a ground fault of the drive signal of the relay distinctively from each other. Therefore, if the relay driving device is turned off while the upstream side of the relay is connected to the battery, it is possible to detect a disconnection or ground-fault occurrence in the drive signal of the relay on the basis of the voltage value detected by the voltage detection device. In addition, if the relay driving device is turned off while the upstream side of the relay is connected to the battery, the relay is turned on or off, depending on whether what has occurred is a disconnection or a ground fault. The failure detection device is capable of detecting a disconnection, and a ground fault of the drive signal of the relay distinctively from each other according to whether or not the pressure value detected by the pressure detection device is increased.

According to the invention, the relax driving device and the voltage detection device are connected to the upstream side of the relay. The failure determination device detects a disconnection and a supply fault of the drive signal of the relay distinctively from each other. It is then possible to avoid wasting the power of the battery by disconnecting the downstream side of the relay when a supply fault is detected.

According to the invention, the control device implements the control for lowering the vehicle height of the vehicle when a disconnection is detected by the failure determination device. The disconnection occurrence in the drive signal of the relay makes it impossible to drive the fluid power pump. However, the air exhaustion control can be carried out to discharge oil and air from the fluid power suspension bodies. This allows the vehicle height control to be implemented for lowering the vehicle height in accordance with vehicle conditions.

In a first aspect of the suspension system, the suspension system includes a battery installed in a vehicle; a fluid power pump operated by being powered by the battery; a relay connecting the battery and the fluid power pump; fluid power suspension bodies mounted on a plurality of wheels of the vehicle; supply/exhaust valves placed between the fluid power pump and the respective fluid power suspension bodies; an exhaust valve configured to discharge a working fluid in a discharge side of the fluid power pump; a pressure detection device configured to detect pressure of the working fluid in the discharge side of the fluid power pump; a relax driving device configured to output a drive signal to the relay; a voltage detection device configured to detect the drive voltage of the relay; a vehicle behavior detection device configured to detect behavior of the vehicle; and a control device. The control device includes a failure determination device configured to detect at least either one of a supply fault and a ground fault of the drive signal of the relay distinctively from a disconnection on the basis of a voltage value detected by the voltage detection device and a pressure value detected by the pressure detection device.

In a second aspect of the suspension system according to the first aspect, the relay driving device and the voltage detection device may be connected to a downstream side of the relay, and the failure determination device may be configured to detect a disconnection and a ground fault of the drive signal of the relay distinctively from each other.

In a third aspect of the suspension system according to the first aspect, the relay driving device and the voltage detection device may be connected to an upstream side of the relay, and the failure determination device may be configured to detect a disconnection and a supply fault of the drive signal of the relay distinctively from each other.

In a fourth aspect of the suspension system according to any one of the first to third aspects, the control device may be configured to implement control for lowering vehicle height of the vehicle when the failure determination device detects a disconnection.

In a fifth aspect of the suspension system according to the first aspect the failure determination device may be configured to reduce the pressure value of the discharge side of the fluid power pump before starting control for distinguishing between a ground fault and a disconnection of the drive signal of the relay.

The foregoing description refers to only some embodiments of the invention. One skilled in the art should easily understand that the exemplary embodiments may be modified or improved in various ways without materially departing from the novel teachings and advantages of the invention. Accordingly, all such modifications and improvement are ended to be included within the technical scope of the invention. The embodiments may be combined in any ways.

The present application claims priority under Japanese Patent Application No. 2015-131334 filed on Jun. 30, 2015. The entire disclosure of Japanese Patent Application No. 2015-131334 filed on Jun. 30, 2015, including the description, claims, drawings and abstract, is incorporated herein by reference in its entirety.

REFERENCE SIGNS LIST

1 Vehicle body; 2A-2D Wheels; 3 Air suspension (Fluid power suspension body); 5 Air compressor module (Fluid power pump); 6 Air compressor; 7 Electric motor; 12 Exhaust valve (Air release valve); 15 Supply exhaust valve (Supply-and-exhaust valve); 16 Vehicle height sensor (Vehicle behavior detection device); 17 Pressure sensor (Pressure detection device); 21 Battery; 22 Compressor relay (Relay); 25 Controller; 20, 41 Compressor driver (Relay driving device); 27, 42 FS relay (Relay driving device); 28, 44 Ground-side voltage monitor (Voltage detection device); 29, 43 Battery-side voltage monitor (Voltage detection device); 30 Microcomputer (Control device)

The invention claimed is:
1. A suspension system comprising:
a battery installed in a vehicle;
a fluid power pump operated by being powered by the battery;
a relay configured to connect the battery and the fluid power pump;
fluid power suspension bodies mounted on a plurality of wheels of the vehicle;
supply/exhaust valves placed between the fluid power pump and the respective fluid power suspension bodies;
an exhaust valve configured to discharge a working fluid in a discharge side of the fluid power pump;
a pressure detection device configured to detect pressure of the working fluid in the discharge side of the fluid power pump;
a relay driving device configured to output a drive signal to the relay;
a voltage detection device configured to detect drive voltage of the relay;

a vehicle behavior detection device configured to detect behavior of the vehicle; and a control device, wherein the control device includes a failure determination device configured to detect at least either one of a supply fault and a ground fault of the drive signal of the relay distinctively from a disconnection on the basis of a voltage value detected by the voltage detection device and a pressure value detected by the pressure detection device.

2. The suspension system of claim 1, wherein the relay driving device and the voltage detection device are connected to a downstream side of the relay, and wherein the failure determination device is configured to detect a disconnection and a ground fault of the drive signal of the relay distinctively from each other.

3. The suspension system of claim 1, wherein the relay driving device and the voltage detection device are connected to an upstream side of the relay, and wherein the failure determination device is configured to detect a disconnection and a supply fault of the drive signal of the relay distinctively from each other.

4. The suspension system of claim 1, wherein the control device is configured to implement control for lowering vehicle height of the vehicle when a disconnection is detected by the failure determination device.

5. The suspension system of claim 1, wherein the failure determination device is configured to reduce the pressure value of the discharge side of the fluid power pump before starting control for distinguishing between a ground fault and a disconnection of the drive signal of the relay.

* * * * *